US012793399B2

(12) United States Patent
Tagomori et al.

(10) Patent No.: US 12,793,399 B2
(45) Date of Patent: Nov. 10, 2026

(54) INFORMATION PROCESSING APPARATUS FOR DETECTING OVERFITTING OF LEARNED MODEL

(71) Applicant: NOMURA RESEARCH INSTITUTE, LTD., Tokyo (JP)

(72) Inventors: Teruhiro Tagomori, Irvine, CA (US); Yuta Tsunoda, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 403 days.

(21) Appl. No.: 18/532,538

(22) Filed: Dec. 7, 2023

(65) Prior Publication Data

US 2025/0191349 A1 Jun. 12, 2025

(51) Int. Cl.
*G06V 10/776* (2022.01)
*G06V 10/22* (2022.01)

(52) U.S. Cl.
CPC ............ *G06V 10/776* (2022.01); *G06V 10/22* (2022.01)

(58) Field of Classification Search
CPC ........ G06V 10/22; G06V 10/25; G06V 10/82; G06V 10/776; G06V 20/52; G06V 2201/07; G06V 40/171
See application file for complete search history.

(56) References Cited

U.S. PATENT DOCUMENTS 11,704,965 B2 * 7/2023 Hilbert ................ G07F 17/3206 463/31
2022/0164602 A1 * 5/2022 Frtunikj ............... G06V 10/774
2022/0222582 A1 7/2022 Yokota

FOREIGN PATENT DOCUMENTS

JP 7207565 B2 1/2023
KR 100815291 B1 * 3/2008 ........... G06V 10/255

OTHER PUBLICATIONS

Hwan, et al. (Computer English Translation of Korean Patent No. 10-0815291). (Year: 2007).*
Sundararajan et al., “Axiomatic Attribution for Deep Networks”, arXiv, 2017, https://arxiv.org/abs/1703.01365, total 11 pages.

* cited by examiner

*Primary Examiner* — Daniel G Mariam
(74) *Attorney, Agent, or Firm* — RANKIN, HILL & CLARK LLP

(57) ABSTRACT

An information processing apparatus detects overfitting of a machine learning model. The information processing apparatus outputs a first object region indicating a region of a first object in an input image by using the machine learning model for detecting an object in an image, and specifies, as a basis region, a region in which a contribution degree of each of image features is higher than a predetermined threshold value when the machine learning model outputs the first object region. The information processing apparatus executes an object detection process in a mask image, and determines whether or not the first object is detected again by using the machine learning model, the mask image obtained by invalidating the image features distributed in a region different from the first object region in the basis region in the input image.

5 Claims, 11 Drawing Sheets

INFORMATION PROCESSING APPARATUS FOR DETECTING OVERFITTING OF LEARNED MODEL

BACKGROUND OF THE INVENTION

1. Technical Field

The present invention relates to an information processing apparatus for detecting overfitting of a learned model.

2. Description of the Related Art

In recent years, a technique, has been known, for detecting an object in an image by using a model (a machine learning model) learned by machine learning such as deep learning. In general, it is desirable to cause the machine learning model to be learned by using a large amount of training data. In a case where the machine learning model is learned by using a small amount of training data or biased training data, the machine learning model may be in an over-fitted state, and erroneous detection or detection omission occurs.

JP 7207565 B2 discloses a technique for detecting overfitting of a machine learning model in a case where verification data are sequentially input to each of an inspector model learned by using a limited number of biased training data and a target machine learning model, and a matching rate of each output result (a classification result) is greater than or equal to a threshold value. Furthermore, Mukund Sundararajan and two others, "Axiomatic Attribution for Deep Networks", [online], [searched on Sep. 1, 2023], and <URL: https://arxiv.org/abs/1703.01365> disclose a technique for measuring and visualizing a contribution degree of a feature of each input value (an image or a text) for prediction by a deep network.

By the way, even if the overfitting of the machine learning model can be detected, it is difficult to objectively grasp what kind of factors may cause the overfitting. Furthermore, even in a case where the contribution degree of the feature of the each input value is visualized, it is only possible for a person to grasp what an input value having a high contribution degree refers to.

SUMMARY OF THE INVENTION

The present invention has been made in view of the above problems, and an object thereof is to achieve a technique capable of suggesting what kind of factors may cause the overfitting of the machine learning model.

In order to solve the problem, for example, the information processing apparatus according to the present invention is an information processing apparatus for detecting overfitting of a machine learning model, the information processing apparatus including:

one or more processors; and a memory that stores one or more commands, the one or more commands, when executed by the one or more processors, causing the information processing apparatus to:

output, in an input image, a first object region indicating a region of a first object by using a machine learning model for detecting an object in an image;

specify, as a basis region, a region in which a contribution degree of each of image features is higher than a predetermined threshold value when the machine learning model outputs the first object region; and execute an object detection process in a mask image, and determine whether or not the first object is detected again by using the machine learning model, the mask image obtained by invalidating the image features distributed in a region different from the first object region in the basis region in the input image.

According to the present invention, it is possible to suggest what kind of factors may cause the overfitting of the machine learning model.

DETAILED DESCRIPTION

Figure 1:
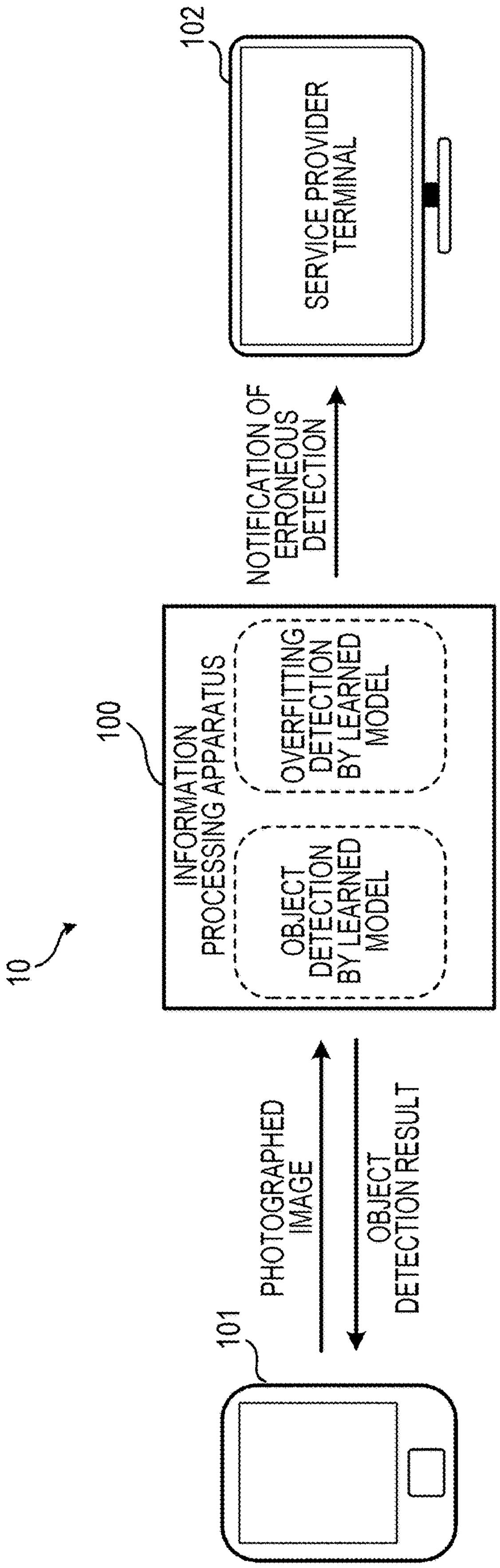
FIG. 1 is a diagram illustrating an outline of an information processing system according to an embodiment of the present invention.

Embodiments will be described in detail below with reference to the accompanying drawings. Note that the following embodiments do not limit the invention according to the claims, and all combinations of the features described in the embodiments are not necessarily essential to the invention. Two or more features of a plurality of features described in the embodiments may be arbitrarily combined. Furthermore, the same or similar configurations are denoted by the same reference numerals, and redundant description will be omitted.

<Outline of Information Processing System>

An example of an information processing system according to the present embodiment will be described with reference to FIG. 1. An information processing system 10 includes, for example, an information processing apparatus 100 and a service provider terminal 102. The information processing apparatus 100 provides a service for detecting an object in an image by using a learned model. Furthermore, the information processing apparatus 100 can perform a process of detecting overfitting of the learned model in the information processing apparatus.

For example, the information processing apparatus 100 receives a photographed image from a communication device 101 and returns an object detection result. Note that the apparatus that transmits the photographed image and the apparatus that receives the object detection result may be separate devices, and for example, an image transmission device (for example, a monitoring camera) that transmits the photographed image and the communication device 101 may be separately configured. The information processing apparatus 100 can communicate with the communication device 101 (or the image transmission device) and the service provider terminal 102 via a network.

For example, as implementation of a predetermined service including object detection, the information processing apparatus 100 detects an object in the photographed image by using the machine learning model, and transmits an object detection result to another device. The object detection result may include information indicating the object detected (for example, a frame indicating a region of the object detected, a color or text indicating a name of the object, or a numerical value such as a score for the object during the detection). Note that, in the following description, the machine learning model (a detection model) to be executed to detect an object will be described as an example, but the machine learning model is not limited to a model that detects an object, and may be a classification model that classifies a subject. Note that the detection model includes, for example, a model using a deep neural network known as YOLO or the like. However, the detection model may be any of various models as long as the models include an object detection function. In the present embodiment, examples of the object may include a person, an animal, a plant, a vehicle, a building, daily necessities, a food item, and the like. Therefore, examples of the detection model may include: a model that detects a person in an image; a model that detects an animal in an image; a model that detects a specific article (for example, a vehicle, daily necessities, or the like) in an image; a model that detects a plurality of these types of objects, or the like. Furthermore, the detection model may be a model that detects an object having a specific feature (for example, a person performing a specific action, a person wearing a specific article, a person of a specific sex, or the like).

Examples of the predetermined service may include a service that detects and annotates at least one of a person, an animal, a plant, a vehicle, a building, daily necessities, a food item, and the like from a photographed still image or moving image, provides information related to an object detected, and provides navigation. Furthermore, examples of the predetermined service may also include a service that provides information for analyzing a still image or a moving image by detecting the above objects from the still image or the moving image to be transmitted from a fixed device such as a monitoring camera.

Furthermore, the information processing apparatus 100 executes the overfitting determination process to be described later in addition to detection of an object in an image using the detection model. Although details will be described later, the overfitting determination process is a process of determining the overfitting of the machine learning model by performing object detection using a mask image to be generated during the process.

In the overfitting determination process, an image and a set value are set by an operation in the service provider terminal 102, and the information processing apparatus 100 executes the overfitting determination process and transmits a processing result to the service provider terminal 102. The service provider terminal 102 is a terminal to be managed by a service provider, and for example, the service provider provides an object detection service for detecting an object in an image photographed. For the detection model, the service provider terminal 102 can perform, for example, setting of a hyperparameter of the detection model, learning and deployment of the detection model, confirmation of an operation state of the detection model, and the like. The information processing apparatus 100 transmits results of the overfitting determination process to the service provider terminal 102, and thus the service provider can grasp presence of the overfitting (or possibility of the overfitting) in the detection model being used. The service provider can relearn the detection model by preparing new training data or adding the mask image generated in the overfitting determination process to the training data according to the results of the overfitting determination process.

The information processing apparatus 100 is, for example, a server device. The information processing apparatus 100 may be, for example, a server device that implements a cloud service platform, and the object detection process and the overfitting determination process described above may be implemented on the cloud service platform. However, the information processing apparatus 100 may be an edge node disposed on the network, or a node constituting a P2P network. Alternatively, the information processing apparatus 100 may be a virtual machine configured on the cloud service platform.

Furthermore, in the present embodiment, a case where the object detection process and the overfitting determination process are executed on the information processing apparatus 100, will be described as an example. However, the present embodiment is also applicable to a case where the process is executed by a plurality of server devices that implement the cloud service platform. Furthermore, the present embodiment is also applicable to a case where the overfitting determination process is executed in the service provider terminal 102.

The communication device 101 is, for example, a tablet device or a smartphone, but may be a personal computer, or the like. Furthermore, the service provider terminal 102 is, for example, a personal computer, but may be a tablet device or a smartphone.

<Hardware Configuration Example of Information Processing Apparatus>

Figure 2:
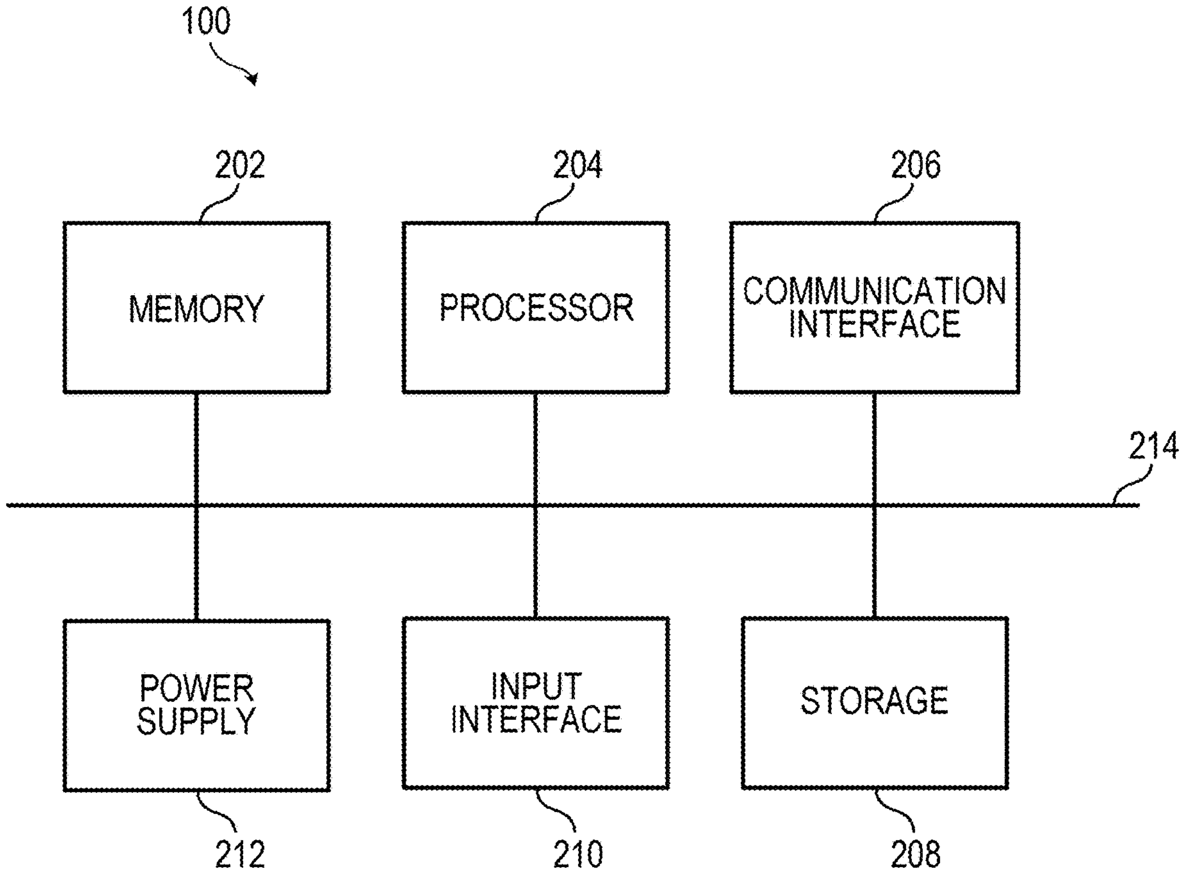
FIG. 2 is a block diagram illustrating a hardware configuration example of an information processing apparatus according to the present embodiment.

A hardware configuration example of the information processing apparatus 100 will be described with reference to FIG. 2. The information processing apparatus 100 includes a memory 202, a processor 204, a communication interface 206, a storage 208, an input interface 210, and a power supply 212. These elements are each connected to a bus 214 and communicate with one another via the bus 214.

The memory 202 is a volatile storage medium such as a DRAM, and temporarily stores data and a program. Furthermore, the storage 208 is a non-volatile storage medium that permanently stores the data and the program. The program to be stored includes one or more commands executable by a processor. The storage 208 may be, for example, a semiconductor memory or a hard disk. The storage 208 can store training data for learning a neural network, test data for testing the neural network learned, and various data such as a photographed image received from the communication device 101.

The processor 204 includes, for example, an arithmetic circuit such as a central processing unit (CPU). The processor 204 may be configured by one or more processors. The processor 204 may further include an arithmetic circuit (for example, a GPU) and dedicated hardware for executing a statistical process such as machine learning at a higher speed, and may include a memory inside. The processor 204 deploys a program stored in the storage 208 to the memory 202, and executes the program to implement various functions of the information processing apparatus 100.

The communication interface 206 is an interface for transmitting and receiving data to and from a device outside the information processing apparatus 100. The communication interface 206 may include a communication circuit capable of communication in a communication scheme in conformity to various standards. The communication interface 206 is connected to the network, and exchanges the data with the service provider terminal 102 and the like illustrated in FIG. 1 via the network. The input interface 210 is, for example, a device for receiving an input from an administrator of the information processing apparatus 100, but may not be provided.

The power supply 212 is a circuit or a module for providing power for each unit of the information processing apparatus 100 to operate. The power supply 212 may include a battery.

<Functional Configuration Example of Information Processing Apparatus>

Figure 3:
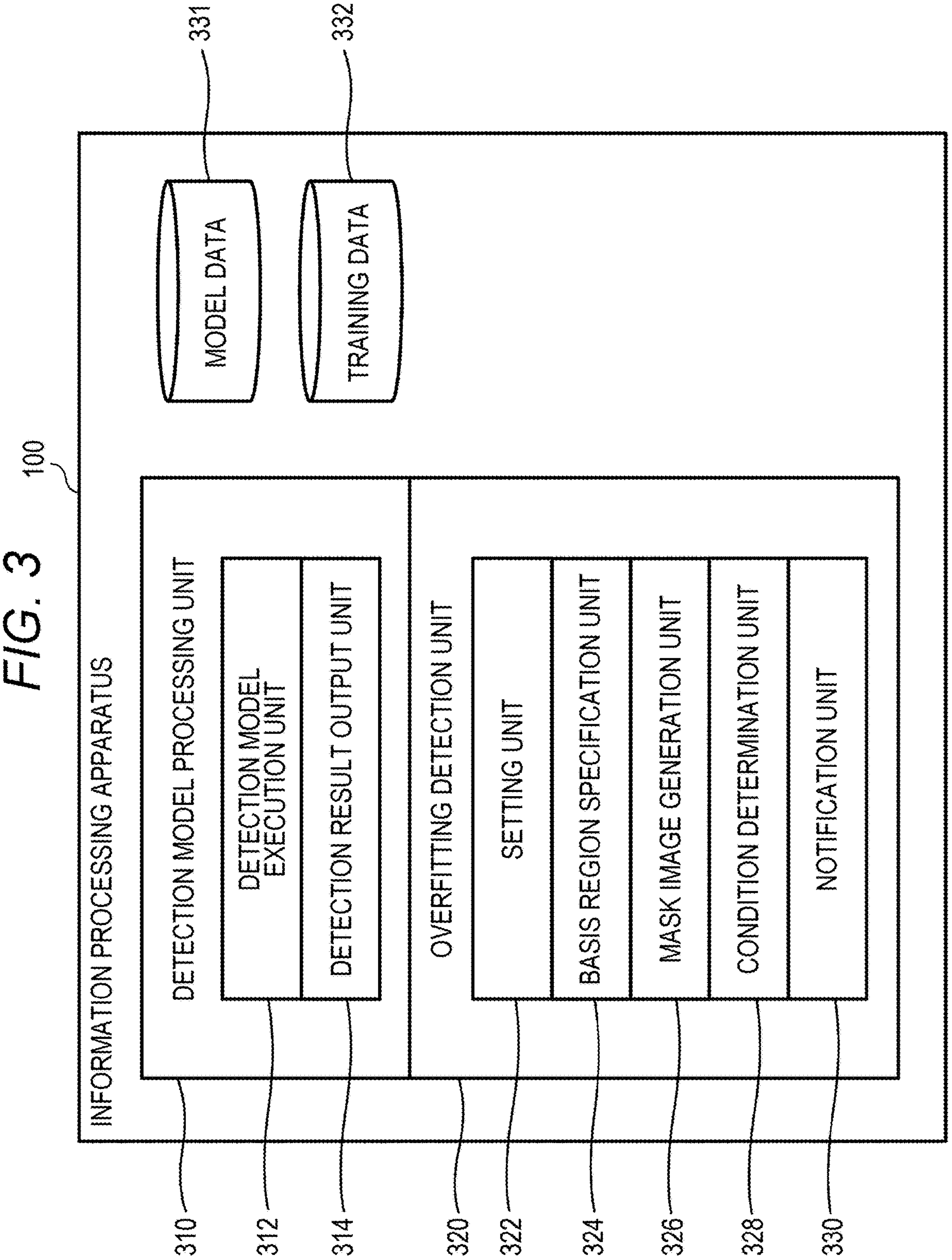
FIG. 3 is a block diagram illustrating a functional configuration example of the information processing apparatus according to the present embodiment.

Next, a functional configuration example of the information processing apparatus 100 will be described with reference to FIG. 3. The functional configuration example illustrated in FIG. 3 can be implemented by, for example, the processor 204 deploying the program stored in the storage 208 to the memory 202 and executing the program. Note that each of functional blocks described in the present embodiment may be integrated or separated, and the functions described may be implemented by another block. Furthermore, what has been described as hardware may be implemented by software, and vice versa.

A detection model processing unit 310 includes a detection model execution unit 312 and a detection result output unit 314, and executes the object detection process with functional configurations of these units. Furthermore, the detection model processing unit 310 can include a data acquisition function of acquiring a photographed image from an external device. The photographed image may be included in a plurality of frames constituting the moving image. For example, the detection model processing unit 310 may acquire a moving image including images of a plurality of consecutive frames from the communication device 101. Furthermore, the detection model processing unit 310 executes the object detection process in the overfitting determination process. At this time, the detection model processing unit 310 can acquire the photographed image (an input image) temporarily or permanently stored in the storage 208 according to an instruction from the service provider terminal 102. Furthermore, the detection model processing unit 310 can acquire, as an input for the object detection process, a mask image generated by an overfitting detection unit 320 to be described later, according to an instruction from the service provider terminal 102.

The detection model execution unit 312 inputs the photographed image or the mask image acquired by the detection model processing unit 310, executes a process of a learned detection model, and detects an object in the image. The detection model outputs, for example, a frame indicating a region of the object detected, a color or text indicating a name of the object detected, and a numerical value indicating a probability during the detection. Note that the frame may include a plurality of coordinates for specifying the frame.

The detection result output unit 314 outputs information about the object detected by the detection model (that is, the object detection result). Using an output from the detection model execution unit 312, the detection result output unit 314 superimposes the frame indicating the region of the object on the photographed image to generate the object detection result. The detection result output unit 314 can provide the object detection result generated to, for example, the communication device 101, the service provider terminal 102, and the overfitting detection unit 320.

The overfitting detection unit 320 includes a setting unit 322, a basis region specification unit 324, a mask image generation unit 326, a condition determination unit 328, and a notification unit 330, and the overfitting detection unit 320 executes the overfitting determination process by functional configurations of these units.

The setting unit 322 sets a model, an image, a label, and the like to be used in the overfitting determination process in accordance with, for example, setting information to be transmitted from the service provider terminal 102. The setting information includes, for example, identification information of the model used in the overfitting determination process, a file name or a path of the input image, and a file name or a path of a file including a correct answer label. The identification information of the model is, for example, information for identifying a learned model stored in model data 331.

For example, the basis region specification unit 324 specifies, as a basis region (that is, a region regarded as important in object detection), a region in which a contribution degree of each of image features is higher than a predetermined threshold value when the detection model outputs a specific object region (for example, skis) as a detection result. The basis region specification unit 324 can use integrated gradients that is a known description method to specify the basis region (with reference to Axiomatic Attribution for Deep Networks). Certainly, the present invention is not limited to the example, and the basis region specification unit 324 may use another description method.

The mask image generation unit 326 generates an image (a mask image) obtained by invalidating the image features distributed in a region (for example, a person region) different from the specific object region (for example, the skis) in the basis region in the input image. The mask image generation unit 326 can generate various mask images, and details of the unit will be described later.

By using the detection model, the condition determination unit 328 executes an object detection process in the mask image, and determines whether or not the specific object is detected again even in a case of using the mask image. In other words, the condition determination unit 328 determines whether or not the object region can be correctly detected in a case where the image features distributed in the region (for example, the person region) different from the object region are hidden, during detection of the specific object region (for example, the skis). That is, in a case where the condition determination unit 328 cannot correctly detect the skis if there is no other features such as in the person region when the skis are detected, the detection model determines that the overfitting is present in the detection of the skis. Accordingly, it is possible to suggest that the overfitting using features of a region masked is caused in a case where the skis are not detected again. Note that, in order to determine whether or not the specific object is detected again in the case of using the mask image, the condition determination unit 328 can make the determination based on, for example, a degree of coincidence between the specific object region detected and a region indicated by correct answer data, and coincidence between a class detected and a class indicated by the correct answer data.

In a case where the condition determination unit 328 determines that the overfitting is present, the notification unit 330 causes the service provider terminal 102 to display that the overfitting is present.

Figure 4:
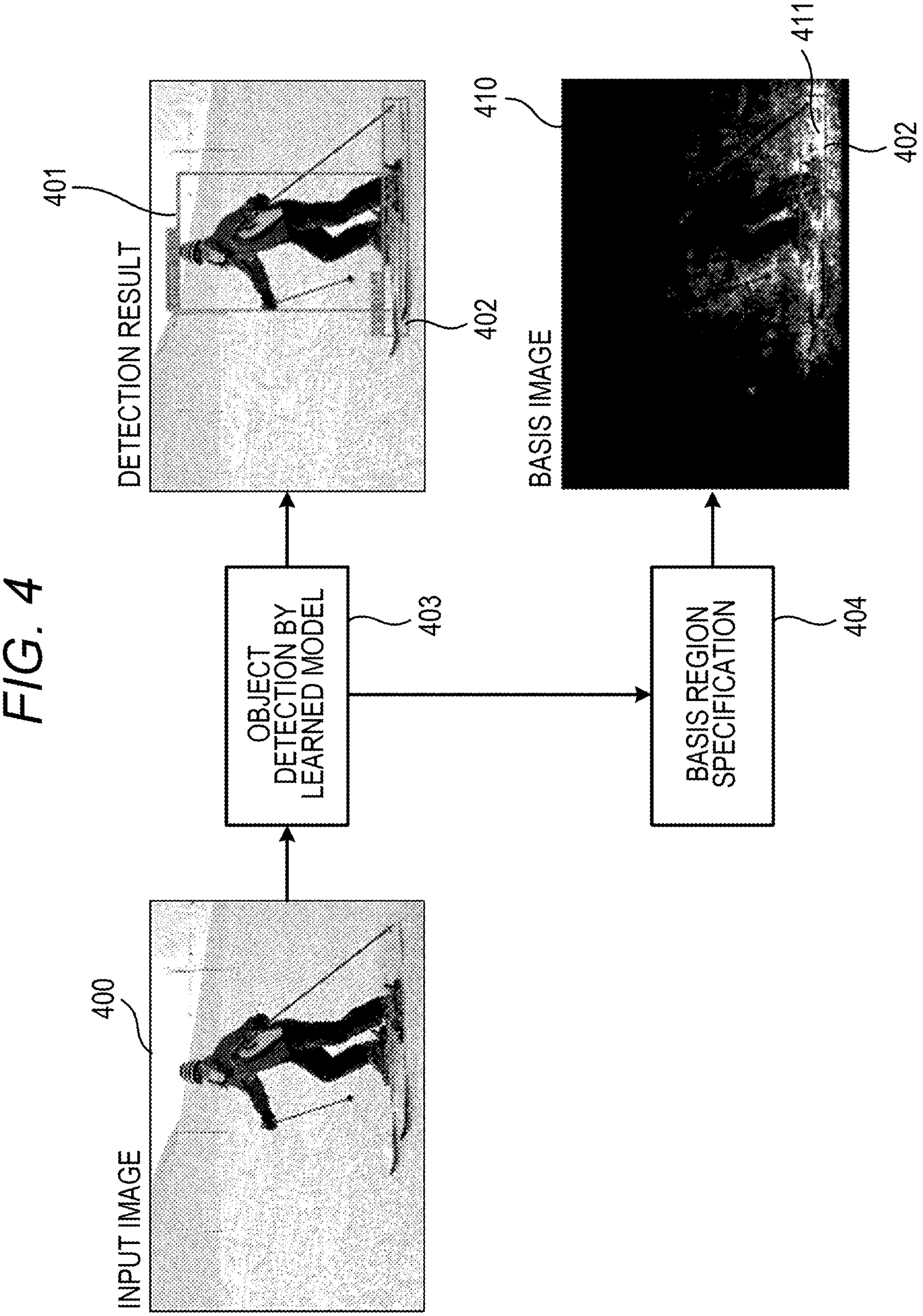
FIG. 4 is a diagram illustrating specification of a basis region according to the present embodiment.

Next, the overfitting determination process will be specifically described with reference to FIGS. 4 to 7. FIG. 4 illustrates a process of specifying the basis region from the input image. First, the detection model execution unit 312 executes an object detection process 403 on an input image 400, and then the detection result output unit 314 outputs a detection result. In the detection result, a person region 401 and a ski region 402 detected are shown. Next, the basis region specification unit 324 executes a basis region specification process 404 to specify the basis region. An image to be generated for visualizing the basis region is shown as a basis image 410. In an example of the basis image 410 illustrated in FIG. 4, a region 411 is represented in white, the region 411 in which a contribution degree of each of image features is higher than a predetermined threshold value when the detection model outputs the ski region 402 as the detection result. In the example of the basis image 410 illustrated in FIG. 4, the contribution degree calculated by using the integrated gradients described above is used.

Figure 5:
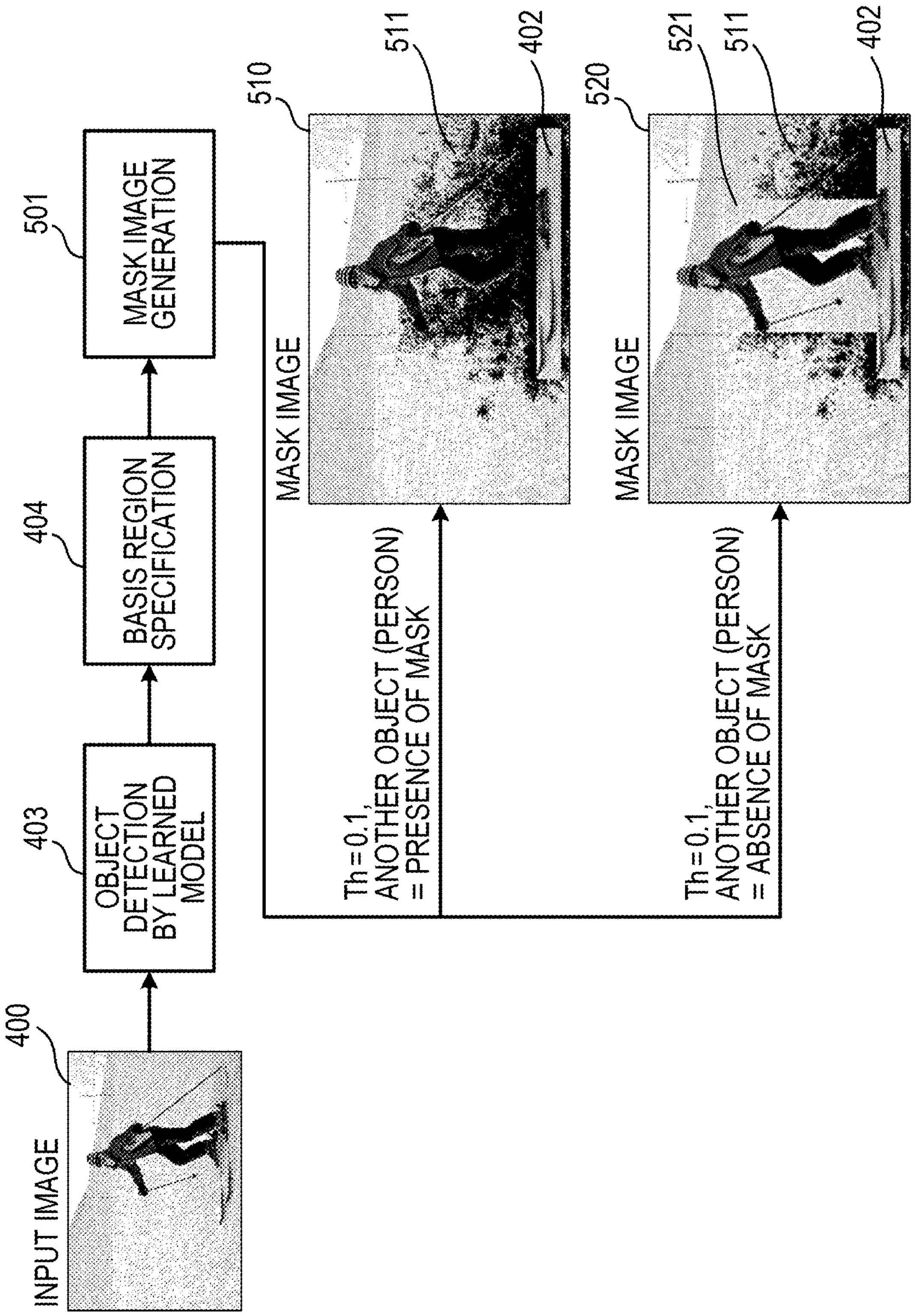
FIG. 5 is a diagram illustrating generation of a mask image according to the present embodiment.

Moreover, a process of generating the mask image from the input image will be described with reference to FIG. 5. The input image 400, the object detection process 403, and the basis region specification process 404 are as in FIG. 4. The mask image generation unit 326 executes a mask image generation process 501. The mask image generation unit 326 can generate various mask images in accordance with a threshold value (Th) for the contribution degree or a setting as to whether or not to mask a region of an object (for example, a person) different from the specific object (for example, the skis). The mask image 510 represents the mask image obtained by invalidating (masking) image features distributed in a region 511 in which a contribution degree of each of the image features is higher than a threshold value (Th=0.1). In an example of the mask image 510, the region masked is overwritten with black. Note that the features of the ski region 402 (a region of a boundary box for the skis) are necessary for the object detection of the skis, and thus the ski region 402 is not masked. When using such mask image 510, the detection model cannot perform the object detection (of the skis) by using the image features distributed in the region 511 masked (the region overwritten with black).

On the other hand, a mask image 520 is an image obtained by masking the region 511 in which the contribution degree of the each of the image features is higher than the threshold value (Th=0.1), but a person region 521 (a region of a boundary box of the person) is not masked. In other words, in a case where the mask image 520 is used, the detection model can detect the object by using the image features distributed in the ski region 402 and the person region 521. On the other hand, in a case where the mask image 510 is used, the detection model cannot use the image features distributed in the person region 521 during the object detection.

Figure 6:
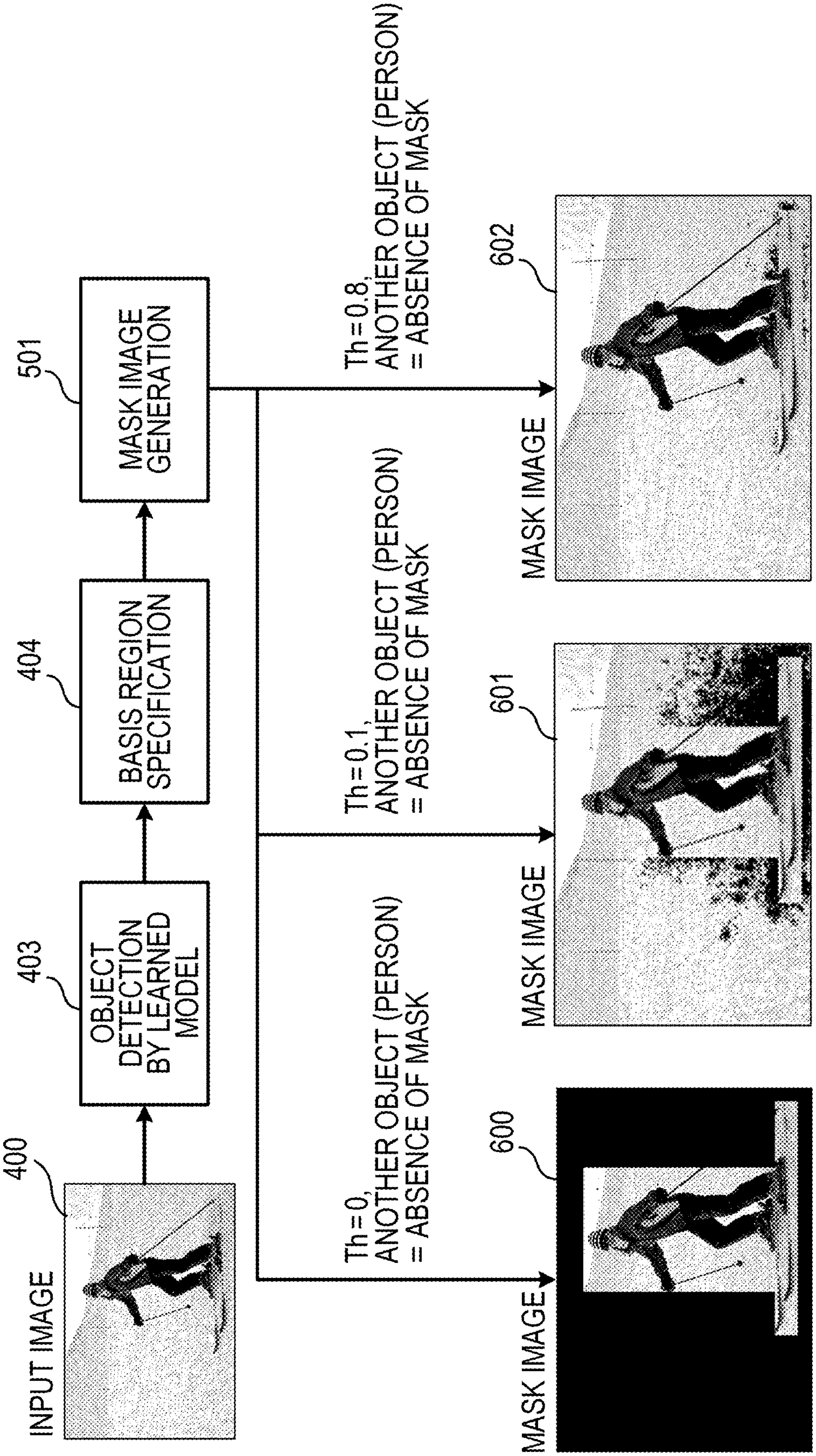
FIG. 6 is a diagram illustrating another example in generation of the mask image according to the present embodiment.

FIG. 6 illustrates various mask images 600 to 602 to be generated by the mask image generation process 501. The example illustrated in FIG. 6 is common in that the ski region and the person region are not masked. The mask image 600 shows a case where the threshold value of the contribution degree of the each of the image features is set to 0. In other words, regions other than the person region and the ski region are masked (shown in black). A mask image 601 shows a case where the threshold value of the contribution degree of the each of the image features is set to 0.1, and a mask image 602 shows a case where the threshold value of the contribution degree of the image features is set to 0.8. Accordingly, changing the threshold value of the contribution degree can change a region that can be used for the object detection.

Figure 7:
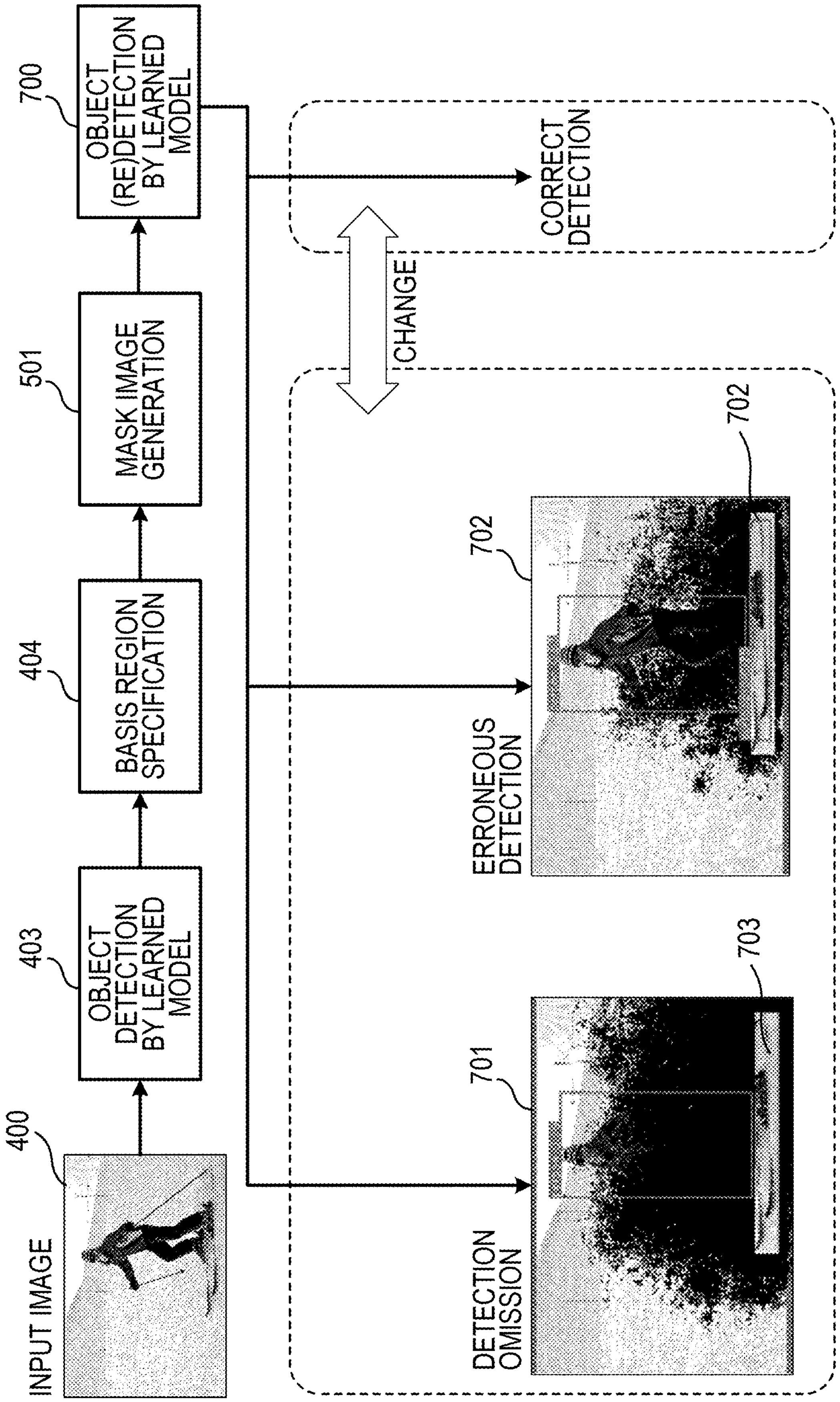
FIG. 7 is a diagram illustrating a method of determining a possibility of overfitting by detection on the mask image according to the present embodiment.

FIG. 7 illustrates a result in a case where an object detection process 700 is performed again in the mask image by using the machine learning model. In the example, the condition determination unit 328 executes the object detection process 700 again, and determines whether or not the skis are detected again. Specifically, the condition determination unit 328 determines whether or not the result of the object detection changes between a case where the input image 400 is used and a case where the region usable for the object detection changes depending on the mask image. In a case where the result of the object detection changes, it can be determined that the detection model is highly likely to use the region masked (for example, the person region other than the ski region) for the object detection.

Alternatively, the change in the result of the object detection may be determined by, for example, whether or not a recall rate (Recall) is equal to or less than a predetermined threshold value. The recall rate is calculated, for example, by dividing the number of correct answers (=TP) with an actual correct answer value being "positive" and a predicted value also being "positive" by the total number of data (=TP+FN) with the actual correct answer value being "positive". At this time, the total number of the data can be, for example, a sum of the numbers of the mask images generated and the input image. For example, in a case where the detection model uses the mask image, the recall rate decreases when detection omission 701 or erroneous detection 702 occurs. The condition determination unit 328 may determine that the overfitting is present in a case where the recall rate is equal to or less than the predetermined threshold value.

Referring again to FIG. 3. The model data 331 forms a database that stores data of the detection model and a verification model. The model data 331 includes information such as hyperparameters and learned parameters of each model. The training data 332 includes a large amount of training data for learning of a learning mode, and each of the training data includes, for example, the image and the correct answer data including a class of the object and a location of the object region in the image.

<Series of Operations of Overfitting Determination Process in Information Processing Apparatus>

Figure 8:
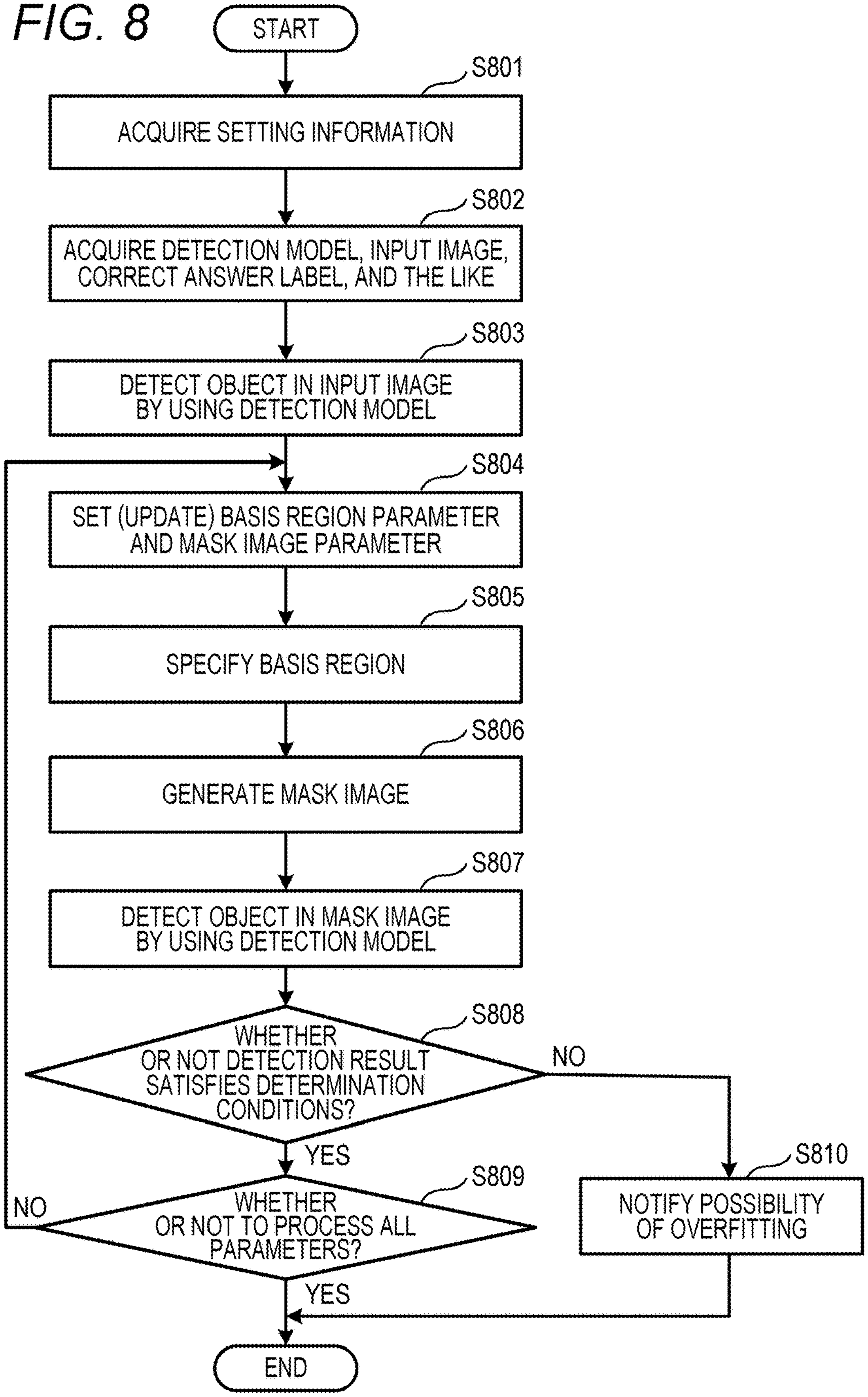
FIG. 8 is a flowchart illustrating operations of an overfitting determination process according to the present embodiment.

Next, a series of operations of the overfitting determination process in the information processing apparatus 100 will be described with reference to FIG. 8. The present process is implemented by the processor 204 executing a computer program stored in the storage 208.

In S801, the setting unit 322 acquires the setting information from the service provider terminal 102. In S802, the setting unit 322 acquires the detection model, the input image, the correct answer label, and the like from the setting information.

Figure 9:
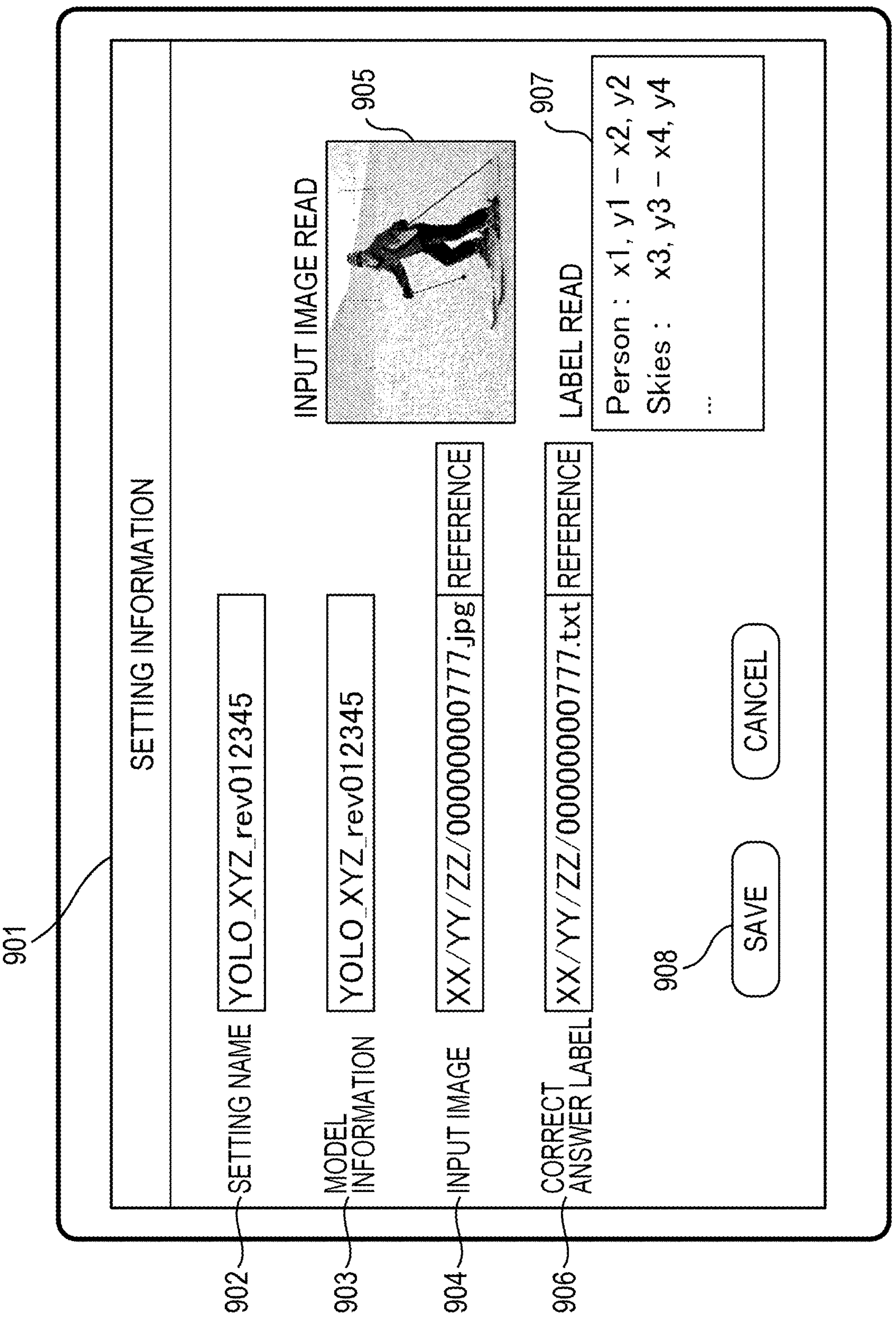
FIG. 9 is a diagram illustrating an example of a user interface used for setting for the overfitting determination process according to the present embodiment.

FIG. 9 illustrates an example of a setting information screen 901 to be displayed on the service provider terminal 102. The setting information screen 901 may be generated by, for example, the setting unit 322 of the information processing apparatus 100 to transmit display information to the service provider terminal 102. The service provider terminal 102 displays the setting information screen by using various applications such as a browser.

The setting information screen 901 receives a user operation for designating a setting name 902, a model information 903, an input image 904, and a correct answer label 906. An arbitrary name for the user to distinguish the setting can be set as the setting name 902. The model information 903 is model identification information. The input image 904 is an input image used for the overfitting determination process. When the input image 904 is designated, the input image designated may be read into an application and displayed in an image region 905 within the setting information screen 901.

Moreover, the correct answer label 906 is designated by a file including a class of a correct answer object included in the input image and a position of the correct answer object. The correct answer label 906 may include object classes and positions of a plurality of objects. When the correct answer label 906 is designated, the correct answer label designated may be read and content of the label may be displayed in 907. By displaying the input image selected and the correct answer label, the user can confirm whether or not the image and the label are intended. When a save button 908 is pressed according to a user operation, settings 902 to 906 are transmitted to the information processing apparatus 100 as the setting information. At this time, the service provider terminal 102 transmits the setting information to the information processing apparatus 100, and then displays an object detection screen illustrated in FIG. 10.

Figure 10:
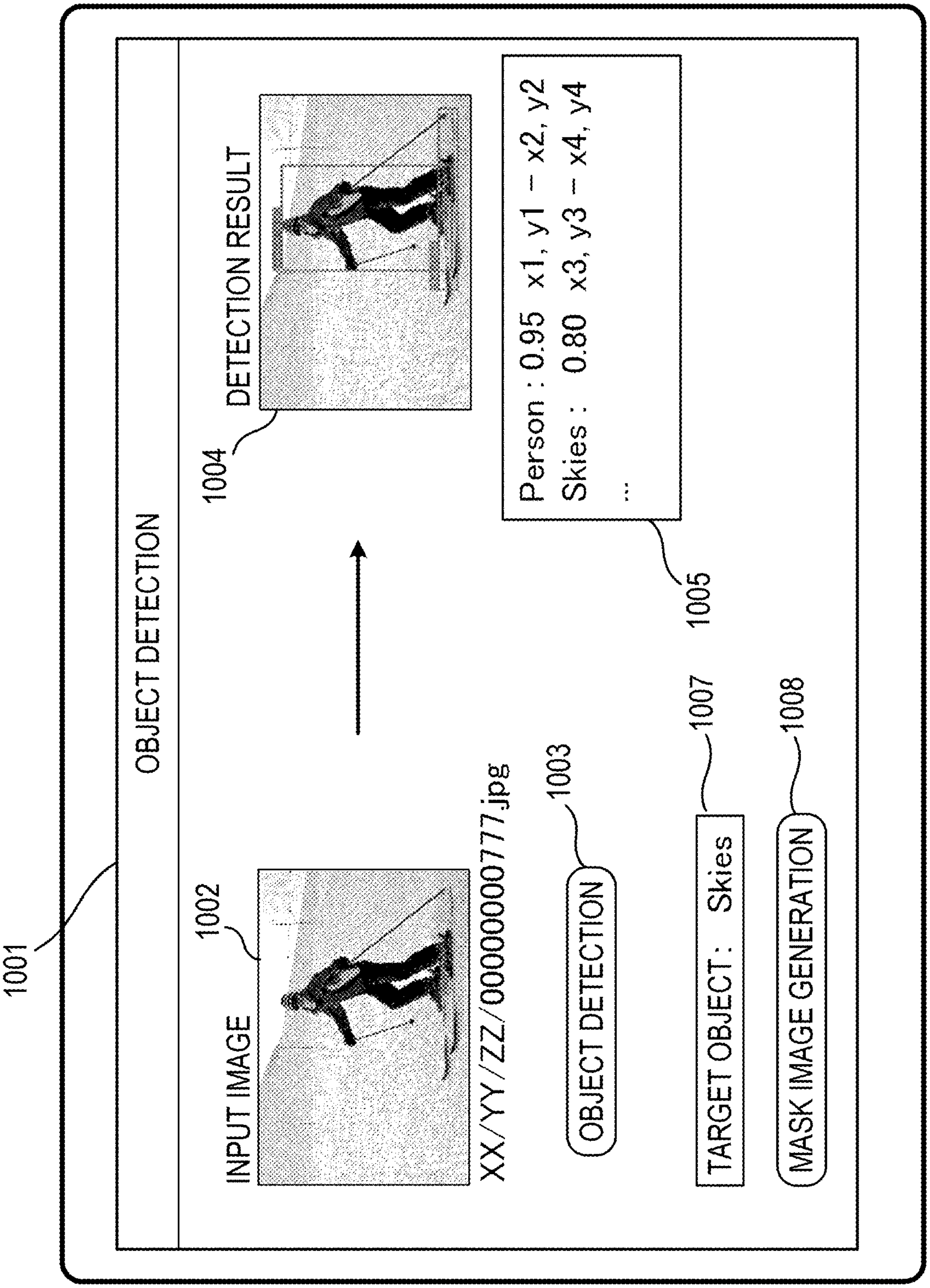
FIG. 10 is a diagram illustrating an example of a user interface indicating an object detection result in the overfitting determination process according to the present embodiment.

FIG. 10 illustrates an example of an object detection screen 1001. The object detection screen 1001 includes an input image 1002 and a button 1003 for executing the object detection. When the button 1003 is pressed by a user operation, the service provider terminal 102 transmits an execution request for the object detection to the information processing apparatus 100.

In S803, the detection model processing unit 310 detects the object within the input image by using the detection model set in S802, and transmits the detection result to the service provider terminal 102. At this time, the service provider terminal 102 displays a detection result image 1004 as illustrated in FIG. 10. On the object detection screen 1001, for example, information and a score of a frame (the boundary box) indicating the person region and the ski region included in the detection result are displayed in a display area 1005.

On the object detection screen 1001, the user can set a mask image parameter for generating the mask image. The mask image parameter can be used to set, for example, a target object 1007 when the mask image is generated. The target object corresponds to the specific object described above. Note that the target object 1007 may be explicitly designated by the user, or may be automatically set by the service provider terminal 102 or the information processing apparatus 100 (for example, from the person and the skis of the detection result). In a case where the target object 1007 (that is, the specific object) is set as the skis, the object different from the specific object is set as, for example, the person.

Although not explicitly illustrated in FIG. 10, the user may further set a setting as to whether or not to mask the region of the object (for example, the person) different from the specific object (for example, the skis) as the mask image parameter. Furthermore, for example, the user may set the threshold value (Th) of the contribution degree of the each of the image features described above as a basis region parameter. When a mask image generation button 1008 is pressed, the service provider terminal 102 transmits the mask image parameter and the basis region parameter to the information processing apparatus 100. In a case where these parameters are not explicitly set by the user, the service provider terminal 102 may generate and transmit the parameters.

In S804, the setting unit 322 sets the basis region parameter and the mask image parameter according to the transmission information from the service provider terminal 102. The basis region parameter includes, for example, the threshold value (Th) of the contribution degree of the each of the image features described above, and the mask image parameter includes a setting as to whether or not to mask the region of the target object (the specific object) or the object different from the specific object. In a case where the information from the service provider terminal 102 does not include these pieces of information, the setting unit 322 can determine and set a value of each parameter. Furthermore, in a case where the each parameter is repeatedly set (that is, in a case where processes after S804 are repeated), the setting unit 322 can change and update the each parameter. For example, the setting unit 322 can gradually reduce the threshold value of the contribution degree from 1 to 0, switch the target object (from the skis to the person), and switch the setting as to whether or not to mask the region of the different object. In other words, the setting unit 322 can generate various mask images by setting various different parameters.

In S805, as described above, the basis region specification unit 324 specifies the basis region based on the basis region parameter. In S806, the mask image generation unit 326 generates the mask image based on the basis region specified in S805 and the mask image parameter, as described above. In S807, the detection model processing unit 310 executes the process of detecting the object in the mask image generated, by using the detection model.

In S808, the condition determination unit 328 determines whether or not the detection result of the object by the detection model satisfies determination conditions. The condition determination unit 328 may determine that the determination conditions are satisfied in a case where none of the erroneous detection or the detection omission occurs, or in a case where the recall rate (Recall) is greater than or equal to a predetermined threshold value. In a case where the condition determination unit 328 determines that the detection result of the object satisfies the determination conditions, the process proceeds to S809. Otherwise, the process proceeds to S810.

Figure 11:
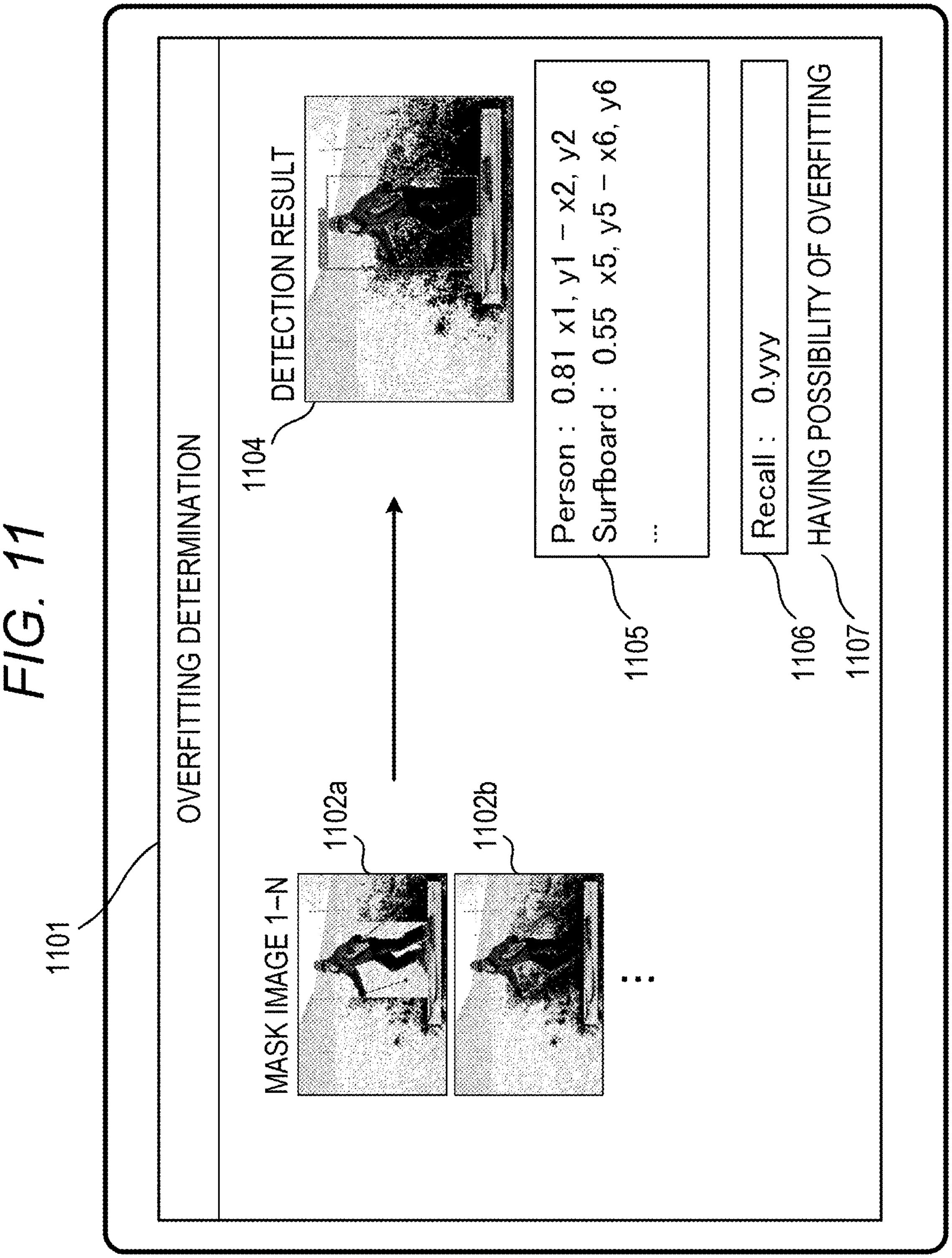
FIG. 11 is a diagram illustrating an example of a user interface indicating a determination result in the overfitting determination process according to the present embodiment.

In S810, the notification unit 330 notifies the service provider terminal 102 of the possibility of the overfitting. FIG. 11 illustrates an example of an overfitting determination screen 1101. The information to be displayed on the overfitting determination screen 1101 is, for example, transmitted to the service provider terminal 102 by the notification unit 330. The overfitting determination screen 1101 displays one or more mask images (1101*a*, 1101*b*, and the like) generated in S806. Furthermore, the overfitting determination screen 1101 displays an image 1104 of a detection result indicating a result of the object detection in the mask image. A reference numeral 1105 denotes the detection result of each of the objects. The detection result 1105 illustrated in FIG. 11 indicates that the skis are erroneously recognized as a surfboard. On the overfitting determination screen 1101, a determination result 1106 by the condition determination unit 328 and a message 1107 indicating the possibility of the overfitting are displayed. The determination result 1106 can indicate, for example, a calculation result of the recall rate (Recall).

In S809, the overfitting detection unit 320 determines whether or not the process is executed on all the parameters. For example, in a case where the basis region parameter or the mask image parameter are changed in S804, the overfitting detection unit 320 determines whether or not all patterns are executed. In a case where it is determined that the process is executed on all the parameters, the overfitting detection unit 320 ends the process. Otherwise, the overfitting detection unit 320 causes the process to return to S804 and repeats the processes from S804 to S810. Accordingly, the overfitting detection unit 320 can repeat specifying the basis region (S805) and determining whether or not the specific object is detected again (S808), while changing the threshold value, the target object, or the like set in S804.

As described above, in the present embodiment, the detection model processing unit 310 outputs the region of the first object (for example, the skis) in the input image by using the detection model. Next, the basis region specification unit 324 specifies, as the basis region, the region in which the contribution degree of the each of the image features is higher than the threshold value (Th) when the machine learning model outputs the region of the first object. Moreover, the condition determination unit 328 executes the object detection process in the mask image (that is, an image obtained by invalidating the image features distributed in a region other than the ski region in the basis region), and determines whether or not the first object is detected again by using the detection model. Accordingly, it is possible to suggest that the overfitting using the features of the region masked is caused in a case where the first object is not detected again. In other words, it is possible to suggest what kind of the factors may cause the overfitting of the machine learning model.

Furthermore, in the present embodiment, the detection model can detect a plurality of objects including the first object and the second object in the input image. Then, during the determination of whether or not the first object is detected again, the condition determination unit 328 executes the object detection process in the mask image, and determines whether or not the first object is detected again, the mask image obtained by invalidating the image features distributed in a region of the second object and a region other than the region of the first object in the basis region. The condition determination unit 328 can suggest the possibility that the overfitting is caused in consideration of presence or absence of the region of the second object.

The invention is not limited to the above embodiments, and various modifications and changes can be made within the scope of the gist of the invention.

What is claimed is:

1. An information processing apparatus for detecting overfitting of a machine learning model, the information processing apparatus comprising:

one or more processors; and a memory that stores one or more commands, the one or more commands, when executed by the one or more processors, causing the information processing apparatus to:

output, in an input image, a first object region indicating a region of a first object and a second object region indicating a region of a second object by using a machine learning model for detecting a plurality of objects including the first object and the second object in the input image;

specify, as a basis region, a region in which a contribution degree of each of image features is higher than a predetermined threshold value when the machine learning model outputs the first object region; and execute an object detection process in a mask image, and determine whether or not the first object is detected again by using the machine learning model, the mask image obtained by invalidating the image features distributed in (i) the second object region and (ii) a region different from the first object region in the basis region in the input image.

2. The information processing apparatus according to claim 1, wherein the one or more commands further cause the information processing apparatus to repeat specifying the basis region and determining whether or not the first object is detected again, while changing the predetermined threshold value or the first object.

3. The information processing apparatus according to claim 1, wherein determining whether or not the first object is detected again includes determination based on a degree of coincidence between the first object region detected and a region indicated by correct answer data, and coincidence between a class detected and a class indicated by the correct answer data.

4. The information processing apparatus according to claim 1, wherein specifying the basis region specifies, as the basis region, a region in which a contribution degree of the each of the image features calculated by using integrated gradients is higher than the predetermined threshold value.

5. An information processing apparatus for detecting overfitting of a machine learning model, the information processing apparatus comprising:

one or more processors; and a memory that stores one or more commands, the one or more commands, when executed by the one or more processors, causing the information processing apparatus to:

output, in an input image, a first object region indicating a region of a first object by using a machine learning model for detecting an object in an image;

specify, as a basis region, a region in which a contribution degree of each of image features is higher than a predetermined threshold value when the machine learning model outputs the first object region; and execute an object detection process in a mask image, and determine whether or not the first object is detected again by using the machine learning model, the mask image obtained by invalidating the image features distributed in a region different from the first object region in the basis region in the input image, wherein determining whether or not the first object is detected again includes determination based on a degree of coincidence between the first object region detected and a region indicated by correct answer data, and coincidence between a class detected and a class indicated by the correct answer data.

* * * * *